US012746811B2

(12) United States Patent
Linhof

(10) Patent No.: US 12,746,811 B2
(45) Date of Patent: Sep. 29, 2026

(54) AIR COOLING MEANS FOR COOLING MOTOR VEHICLE COMPONENTS

(71) Applicant: Dr. Ing. h.c. F. Porsche Aktiengesellschaft, Stuttgart (DE)

(72) Inventor: Fabian Linhof, Ludwigsburg (DE)

(73) Assignee: Dr. Ing. h.c. Porsche Aktiengesellschaft, Stuttgart (DE)

( * ) Notice: Subject to any disclaimer, the term of this patent is extended or adjusted under 35 U.S.C. 154(b) by 392 days.

(21) Appl. No.: 18/542,926

(22) Filed: Dec. 18, 2023

(65) Prior Publication Data

US 2024/0198787 A1 Jun. 20, 2024

(30) Foreign Application Priority Data

Dec. 19, 2022 (DE) ..................... 10 2022 133 866.5

(51) Int. Cl.
*B60K 11/08* (2006.01)
*B60K 11/06* (2006.01)

(52) U.S. Cl.
CPC ............ *B60K 11/085* (2013.01); *B60K 11/06* (2013.01)

(58) Field of Classification Search
CPC ....... B60K 11/085; B60K 11/06; B60K 11/08; B60K 2015/053
See application file for complete search history.

(56) References Cited

U.S. PATENT DOCUMENTS 9,216,644 B2 * 12/2015 Cardile ................ B60K 11/085
2014/0199930 A1 * 7/2014 Toda .................... B60K 11/085 454/75
2015/0047803 A1 * 2/2015 Cardile .................. B60H 1/241 165/41

(Continued)

FOREIGN PATENT DOCUMENTS

DE 10137175 A1 * 2/2003 .............. F01P 7/026
DE 102008013336 A1 * 9/2009 ........... B60K 11/085
DE 102013014447 A1 * 7/2014 ........... F16D 65/847

(Continued)

OTHER PUBLICATIONS

Translated DE-102008013336-A1 (Year: 2026).*
Translated FR-3090559-A1 (Year: 2026).*

*Primary Examiner* — James A Shriver, II
*Assistant Examiner* — Ian Bryce Shelton
(74) *Attorney, Agent, or Firm* — Buchanan Ingersoll & Rooney PC

(57) ABSTRACT

An air-cooling device for cooling motor vehicle components by travel-induced airflow. The device includes a frame delimiting a cooling opening, a cover, which can be inserted into the cooling opening via a separating gap and which is at a distance from the frame for closing a majority of the cooling opening in a closed position. At least one connecting element is connected to the frame and to the cover for bridging the separating gap. The cover can be moved between the closed and open positions, in which the cover is at least partially moved out from an opening plane of the (Continued)

cooling opening delimited by the frame via an elastic deformation of the connecting element. An on-demand and energy-efficient cooling of motor vehicle components is enabled by the elastically deformable connecting element, which is connected to the frame and to the cover and can also cover the separating gap.

10 Claims, 3 Drawing Sheets

(56) References Cited

U.S. PATENT DOCUMENTS

| | | | |
|---|---|---|---|
| 2016/0096425 | A1 | 4/2016 | Walters |

FOREIGN PATENT DOCUMENTS

| | | | | | |
|---|---|---|---|---|---|
| DE | 102019119210 | A1 * | 1/2021 | ........... | B60K 11/085 |
| DE | 102020106511 | A1 | 9/2021 | | |
| EP | 1356850 | A1 * | 10/2003 | ........... | B60K 11/085 |
| FR | 2970218 | A1 * | 7/2012 | ........... | B60K 11/085 |
| FR | 3090559 | A1 * | 6/2020 | ............. | B60K 11/08 |
| KR | 20090100994 | A * | 9/2009 | ........... | B62D 25/085 |
| KR | 20110032018 | A * | 3/2011 | ............. | B60K 11/08 |
| WO | WO-2018162826 | A1 * | 9/2018 | ............. | B60K 11/04 |

* cited by examiner

AIR COOLING MEANS FOR COOLING MOTOR VEHICLE COMPONENTS

CROSS-REFERENCE TO RELATED APPLICATION

This application claims priority to German Patent Application No. 10 2022 133 866.5, filed Dec. 19, 2022, the content of such application being incorporated by reference herein in its entirety.

FIELD OF THE INVENTION

The invention relates to an air cooling means, by means of which motor vehicle components can be cooled by travel-induced airflow. The invention further relates to a front cooling means grill and a side cooling means grill, each comprising such an air cooling means.

BACKGROUND OF THE INVENTION

US 2016/0096425 A1, which is incorporated by reference herein, discloses a front cooling means grill for a motor vehicle in which a plurality of openings can each be opened and closed by a cover that can be displaced in the direction of travel in order to be able to influence a cooling air flow supplied via the front cooling means grill.

SUMMARY OF THE INVENTION

There is a constant need to be able to cool motor vehicle components on demand. Described herein are measures that enable on-demand cooling of motor vehicle components.

Preferred embodiments of the invention are specified in the dependent claims and the following description, which in each case can constitute an aspect of the invention individually or in combination.

One aspect of the invention relates to an air cooling means for cooling motor vehicle components of a motor vehicle by travel-induced airflow, having a frame delimiting a cooling opening, a cover, which can be inserted into the cooling opening via a separating gap and which is at a distance from the frame, for closing a majority of the cooling opening in a closed position, at least one connecting element connected to the frame and to the cover for bridging the separating gap, whereby the cover can be moved between the closed position and an open position, in which the cover is at least partially moved out from an opening plane of the cooling opening delimited by the frame via an elastic deformation of the connecting element.

In the closed position of the cover, the cover, which is substantially oriented in the opening plane, can close the cooling opening, apart from the deliberately provided separating gaps. In particular, the cover is integrated into the provided shape profile of the frame and/or a portion of the outer shell of the motor vehicle on the other side the separating gap. The flow resistance of the air cooling means, and therefore the flow resistance of the motor vehicle, is thereby kept low in the closed position of the cover, so that the energy consumption of the motor vehicle is as low as possible for the forward movement. Preferably, a surface normal of the cover in the closed position does not point exclusively in the direction of travel ("X direction"), but is rather skewed with respect to the direction of travel. In particular, the surface normal of the cover faces predominantly in the transverse direction ("Y direction"). In this case, the travel-induced airflow can flow substantially along the exterior of the cover facing away from the center of the motor vehicle.

In the open position of the cover, travel-induced airflow can arrive at a bottom of the cover facing the motor vehicle center and be diverted into the interior of the motor vehicle in order to cool a motor vehicle assembly, in particular an internal combustion engine, a traction battery, a brake system, a heat exchanger of a cooling circuit, or other heat-generating motor vehicle assemblies to be cooled. By means of the air cooling with travel-induced airflow, the motor vehicle assemblies cooled in this way can be operated with better efficiency so that the energy consumption of the motor vehicle can be kept as low as possible for the forward movement.

The elastically deformable connecting element is connected to both the frame and the cover, in particular directly. The connecting element can thereby not only bridge the separating gap remaining between the frame and the cover, but can also at least partially, preferably to a majority, or even completely close the separating gap. For example, the connecting element can be fastened to a bottom of the frame and a bottom of the cover and can cover the separating gap in a volume below these bottoms. In principle, the connecting element can be designed as a flat and elastically deformable plane. Preferably, the connecting element is designed as a folded and/or bent flat element, e.g. a sheet metal, such that the separating gap can be bridged via at least one U-shaped and/or V-shaped trough. The connecting element is, e.g., designed in the manner of an accordion. The folded and/or bent shape of the connecting element enables it to be easily provided for elastically deformable sub-regions, thereby specifying a defined elastic deformation kinematics. The shape of the connecting element can provide a sufficiently large spring path for the connecting element to move the cover between the closed position and the open position, whereby the connecting element preferably occupies its undeformed starting position either in the closed position or in the open position of the cover and provides a spring-elastic resetting force in the other position. As a result, it is possible to apply an external force only for the movement of the cover into one of the end positions of the cover and to use the spring-elastic resetting force of the connecting means in order to reach the other end position of the cover. The energy input for opening and closing the cooling opening can thereby be minimized. The elastically deformable connecting element connected to the frame and to the cover, which can also cover the separating gap for improved aerodynamics, enables on-demand and energy-efficient cooling of motor vehicle components.

The cover is in particular a flat and level body which is preferably made of a plate or sheet metal. The cover can be positioned in the closed position fully sunk within the frame. Preferably, the cover is at a distance from the frame along its entire lateral circumferential surface, so the at least one separating gap provided between the cover and the frame can completely surround the cover.

The separating gap forms a distance between the frame and the cover that is large enough to enable the cover to be moved from the opening plane of the cooling opening into the open position with a rotational and/or translational movement fraction during the elastic deformation of the connecting element, in particular without striking the frame. The separation gap can feature a gap width between the frame and the cover, in which an inaccuracy in the movement kinematics of the cover as a result of the elastic deformation of the connecting element is considered.

Although the elastic deformation of the connecting element should be associated with positional inaccuracies with respect to the cover, the separating gap can prevent the cover from striking the frame by way of a correspondingly large gap width. The movement of the cover between the closed position and the open position can be accomplished by means of the connecting element and the separating gap without direct contact and/or striking on the frame.

The frame is in particular made of a plastic or metal and is designed rigidly in comparison to the connecting element. By means of the frame, the air cooling means can be installed in the motor vehicle in a precise position and in particular can be mounted in a supporting structure of a motor vehicle body. Preferably, the frame comprises a collar protruding radially outward from the cooling opening, which collar preferably rests flat against a bottom of a body element forming the outer shell of the motor vehicle and is preferably secured, e.g. by means of adhesion. The frame can comprise an inner side that delimits the cooling opening, which preferably extends beyond the extension of the cover in the thickness direction into the interior of the motor vehicle. The frame can thereby constitute the start of an air-guiding channel via which the travel-induced airflow, which is diverted past the cover into the cooling opening in the open position of the cover, can be directed to the motor vehicle assembly to be cooled.

In particular, the cover extends relative to the frame such that, in the open position, travel-induced airflow can be guided along the cover into the cooling opening. Comparable to an air-conducting element or a gill of a fish, the cover can, in the open position, enable the travel-induced airflow to flow along its bottom, thereby diverting it into the cooling opening of the frame. The cover can in this case be, e.g., designed in a planar manner and can extend at an angle to the opening plane of the cooling opening. However, it is also possible that the cover is also elastically deformed and at least partially protrudes out of the opening plane of the cooling opening as a result of the elastic deformation. Preferably, the cover can at least partially form a funnel in order to gather the driving travel-induced airflow approaching the cover and direct it into the cooling opening.

Preferably, the cover is elastically deformed in the open position from a substantially unstressed starting plane. For example, the cover can be elastically compressed by the connecting elements on two opposite sides so that a central portion of the cover can bulge out of the opening plane of the cooling opening. The travel-induced airflow can be trapped by the bulged portion of the cover in said open position of the cover and can be directed into the cooling opening. Preferably, the bulged portion of the cover can at least partially form a funnel in order to bundle the driving travel-induced airflow approaching the cover and direct it into the cooling opening.

Particularly preferably, the cover is elastically deformed in response to elastic deformation forces imparted by the at least one connecting element. As a result, it is not necessary to impart an external deformation force on the cover. Instead, it is sufficient to elastically deform the at least one connecting element, whereby the elastic deformation of the cover results from the resulting forces of the connecting element on the fastening points with the cover.

In particular, in the open position between the cover and the frame, the cover delimits an input opening, a surface normal of which substantially faces in the direction of travel, whereby a partial flow cross-section extending from the input opening counter to the direction of travel tapers between the cover and an opening plane of the cooling opening, the partial flow cross-section being substantially semi-circular in shape. A bulged part of the cover can delimit a funnel-like, in particular funnel-shaped sub-channel which, due to its tapered profile, can divert the approaching travel-induced airflow via the cooling opening into the interior of the motor vehicle.

Preferably, at least two connecting elements are provided, which are attached to edges of the cover that face away from one another. In the relaxed or elastically deformed state, the two connecting elements can push the edges towards one another and thereby cause a portion of the cover to bulge, in particular in a gill-like manner, out of the opening plane of the cooling opening.

Particularly preferably, the connecting element, in particular over at least a majority, extends along one of the separating gaps, whereby an elastic deformation of the connecting element is experienced to different degrees along the separating gap in the open position of the cover. The cover can thereby be subjected to different forces of the connecting element along the path of the separating gap. As a result, it is in particular possible to compress the cover more strongly and less strongly along the edges that follow the respective separating gap, so that an in particular roughly semicircular bulging of the cover with a funnel-like tapering path results.

In particular, an actuator engaging with the cover and/or the connecting element is provided for displacing the cover between the closed position and the open position. By means of the actuator, an opening or closing, in particular in response to an actuation signal of a monitoring unit in communication with the cooling opening for monitoring a cooling of a motor vehicle assembly to be cooled can be triggered by an elastic deformation of the connecting element. In particular, the actuator only directly engages with the at least one connecting element such that the cover is only indirectly displaced, pivoted, and/or deformed by the cover.

Preferably, a further cover is provided, whereby the further cover is connected to the frame via further connecting elements, and the further cover can be moved between a further closed position and a further open position in which the cover is at least partially moved out from an opening plane of the cooling opening delimited by the frame via an elastic deformation of the further connecting element, whereby the further cover adjoins an exterior of the cover in the closed position. The further cover and the further connecting means can in particular be designed and further developed as explained hereinabove using the cover and the connecting means. In the closed position, the cover and the further cover, as well as possible additional covers, can be arranged in a shingle-like and partially overlapping manner one behind the other in the cooling opening of the frame. In the open position, this results in a plurality of points at which travel-induced airflow can be trapped and diverted into the cooling opening. In addition, this results in a very specific and unique design feature, which lends an sporty appearance to the motor vehicle, comparable to the gills of a shark.

A further aspect of the invention relates to a front cooling means grill for cooling a drive motor and/or a traction battery of the motor vehicle, having at least one opening against which the travel-induced airflow can flow and an air cooling means inserted into the opening, which can be formed and further developed as described above. The elastically deformable connecting element connected to the frame and to the cover, which can also cover the separating gap for improved aerodynamics, enables on-demand and energy-efficient cooling of motor vehicle components by means of the front cooling means grill.

A further aspect of the invention relates to a side cooling means grill for cooling a drive motor and/or a traction battery and/or a braking system of the motor vehicle, having at least one opening against which the travel-induced airflow can flow and an air cooling means inserted into the opening, which can be designed and further developed as described hereinabove. The elastically deformable connecting element connected to the frame and to the cover, which can also cover the separating gap for improved aerodynamics, enables on-demand and energy-efficient cooling of motor vehicle components by means of the side cooling means grill.

BRIEF DESCRIPTION OF THE DRAWINGS

The invention is explained by way of example hereinafter with reference to the accompanying drawings on the basis of preferred exemplary embodiments, whereby the features presented hereinafter can represent an aspect of the invention both individually and in combination. Shown are.

DETAILED DESCRIPTION OF THE INVENTION

Figure 1:
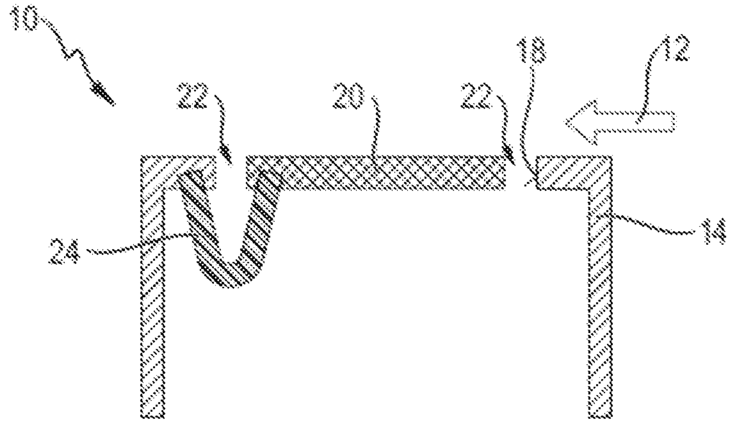
FIG. 1: a schematic, sectioned side view in the Y-direction of an air cooling means in the closed position.
Figure 2:
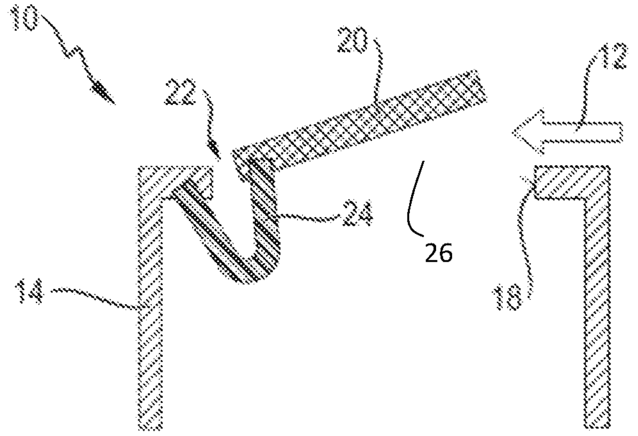
FIG. 2: a schematic, sectioned side view in the Y-direction of the air cooling means in FIG. 1 in the open position.
Figure 3:
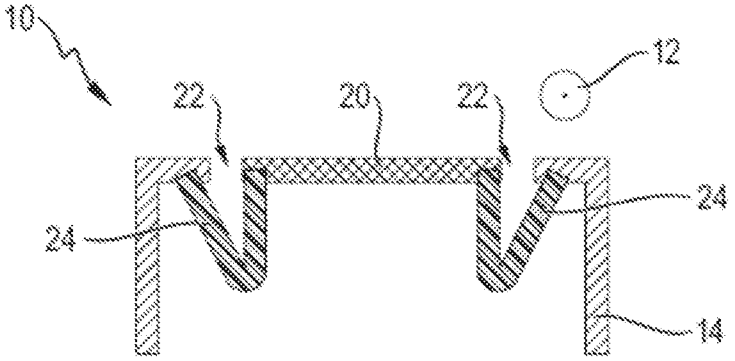
FIG. 3: a schematic, cross-sectional view in the X direction of the air cooling means in FIG. 1 in the closed position.
Figure 4:
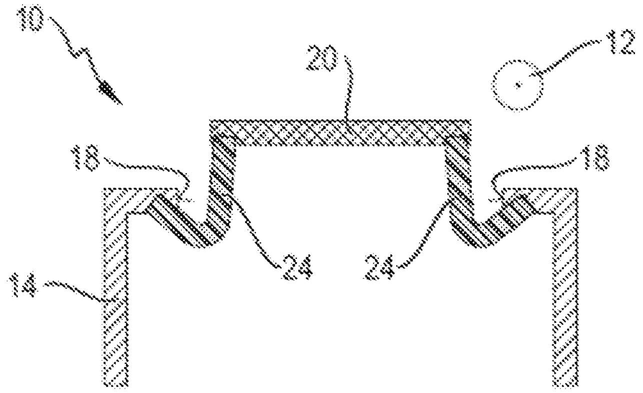
FIG. 4: a schematic, cross-sectional view in the X direction of the air cooling means in FIG. 2 in the open position.

The air cooling means 10 shown in FIG. 1 can be used, e.g., as part of a front cooling means or side cooling means of a motor vehicle in order to provide a low flow resistance in the closed position shown in FIG. 1 and FIG. 3 and, in the open position shown in FIG. 2 and FIG. 4, to direct travel-induced airflow 12 into the interior of the motor vehicle and cool a motor vehicle assembly to be cooled. The air cooling means 10 comprises a frame 14, which can be fastened to a motor vehicle body of the motor vehicle, in particular via an outwardly protruding collar. The frame 14 delimits a cooling opening 18, in whose opening plane is arranged a substantially flat and planar cover 20, whereby the closed position of the cover 20 is defined. A respective separating gap 22 is formed circumferentially between the cover 20, which is, e.g., rectangular, via whose gap width an edge of the cover 20 is at a distance from the opposite part of the frame 14.

Elastically deformable connecting means 24 are connected to the respective edge of the cover 20 and the frame 14. The respective connecting means 24 can bridge the associated separating gap 22. The connecting means 22 can extend in particular along the path of the separating gap 22 so that the separating gap 22 can be closed, and in particular sealed, by the material of the connecting means 24. No connecting means 24 are provided at least in a sub-region of an edge of the cover 20 facing in the direction of travel. For example, the cover 20 and the cooling opening 18 are rectangular in shape, and connecting means 24 are provided on three sides of the cover 20 which substantially completely close the associated separating gap 22.

Figure 5:
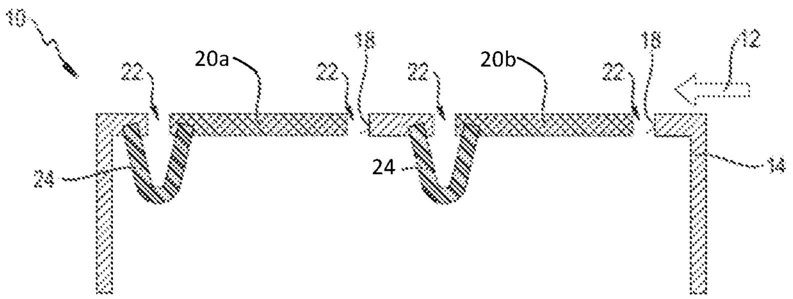
FIG. 5: a schematic, sectioned side view in the Y-direction of an air cooling means in the closed position including two covers.

When the cover 20 is displaced, and/or rotated, and/or elastically deformed into the open position via an elastic deformation of the connecting means 24, as shown in FIG. 2, there results an input opening 26 via which the travel-induced airflow 12 can flow along the bottom of the cover 20 and can be diverted into the cooling opening 18. As shown in FIG. 4, due to its sealing action, the deformed connecting means 24 can prevent the diverted travel-induced airflow 12 from exiting to the environment past the cooling opening 18 via the separating gap 22. FIG. 5 depicts an embodiment including two covers 20*a* and 20*b*.

What is claimed is:

1. An air-cooling device for cooling motor vehicle components of a motor vehicle by travel-induced airflow, said air cooling device comprising:

a frame delimiting a cooling opening, a cover, which is configured to be inserted into the cooling opening via a separating gap and which is at a distance from the frame for closing a majority of the cooling opening in a closed position of the cover, and at least two connecting elements which are each connected to the frame and to the cover for bridging the separating gap, wherein the connecting elements are attached to edges of the cover that face away from one another, wherein the cover is configured to be moved between the closed position and an open position, wherein, in the open position, the cover is at least partially moved out from an opening plane of the cooling opening delimited by the frame via an elastic deformation of the connecting elements.

2. The air-cooling device according to claim 1, wherein the cover extends relative to the frame such that, in the open position, travel-induced airflow can be guided along the cover and into the cooling opening.

3. The air-cooling device according to claim 1, wherein the cover is elastically deformed into the open position from a substantially unstressed starting plane.

4. The air-cooling device according to claim 1, wherein the cover is elastically deformed in response to elastic deformation forces imparted on the connecting elements.

5. The air-cooling device according to claim 1, wherein, in the open position of the cover, the cover delimits an input opening between the cover and the frame, a surface normal of which substantially faces in a direction of travel, wherein a partial flow cross-section extending from the input opening counter to the direction of travel tapers between the cover and an opening plane of the cooling opening, wherein the partial flow cross-section is substantially semi-circular in shape.

6. The air-cooling device according to claim 1, wherein at least a majority of each connecting element extends along the separating gap, wherein an elastic deformation of each connecting element is pronounced at different degrees along the separating gap in the open position of the cover.

7. The air-cooling device according to claim 1, further comprising a further cover, wherein the further cover is connected to the frame via further connecting elements, wherein the further cover can be moved between a further closed position and a further open position, in which the further cover is at least partially moved out from an opening plane of the cooling opening delimited by the frame via an elastic deformation of the further connecting elements, wherein the further cover adjoins an exterior of the cover in the closed position.

8. A front cooling device grill for cooling a drive motor and/or a traction battery of a motor vehicle, said front cooling grill comprising at least one opening against which the travel-induced airflow can flow and the air-cooling device of claim 1 inserted into the opening.

9. A side cooling device grill for cooling a drive motor, and/or a traction battery, and/or a braking system of a motor vehicle, said side cooling grill comprising at least one opening against which the travel-induced airflow can flow and the air-cooling device of claim 1 inserted into the opening.

10. A motor vehicle comprising the air-cooling device of claim 1.

* * * * *